United States Patent [19]

Gass

[11] Patent Number: 4,823,722

[45] Date of Patent: Apr. 25, 1989

[54] SEMI-SUBMERSIBLE MARINE CRAFT

[76] Inventor: André Gass, 6, Avenue de la Marseillaise, 67000 Strasbourg, France

[21] Appl. No.: 84,386

[22] Filed: Aug. 11, 1987

Related U.S. Application Data

[63] Continuation-in-part of Ser. No. 738,038, May 24, 1985, abandoned.

[30] Foreign Application Priority Data

May 29, 1984 [FR] France ................... 84 08631

[51] Int. Cl.⁴ .............................................. B63G 8/22
[52] U.S. Cl. ...................... 114/333; 114/61; 114/256
[58] Field of Search ............... 114/312, 313, 330, 331, 114/333, 334, 336–339, 341, 61, 66, 256

[56] References Cited

U.S. PATENT DOCUMENTS 3,129,681  4/1964  Bajulaz .................. 114/333

FOREIGN PATENT DOCUMENTS 1420980  11/1965  France ................ 114/312
564399   6/1957  Italy .................. 114/312

Primary Examiner—Sherman D. Basinger
Assistant Examiner—Jesûs D. Sotelo
Attorney, Agent, or Firm—Emmanuel J. Lobato; Robert E. Burns

[57] ABSTRACT

A semi-submersible marine craft for operation on the surface or in a semi-submerged condition has a pair of spaced parallel tubular water ballast floats disposed horizontally on either side of a vertical middle plane. The floats are disposed symmetrically relative to a central nacelle incorporating the power unit for propelling the craft and comprising a watertight cabin for the passengers. Control apparatus are provided for submerging and surfacing the craft, and the necessary control and safety apparatus for operating the craft. The floats and the nacelle have a frame structure made of an assembly of stainless steel sections which are covered by a skin of synthetic material. The nacelle has a cabin with a transparent semi-spherical front portion and side windows. On top of the cabin is hingedly mounted a dome for entry into the craft. Releasable ballast are disposed under the nacelle. Flotation control is provided by inflating and deflating air-inflatable balloons enclosed in the side tubular floats and for variably controlling the buoyancy of the craft by controlling the volumes of water ballast entering and leaving the tubular water ballast floats.

19 Claims, 3 Drawing Sheets

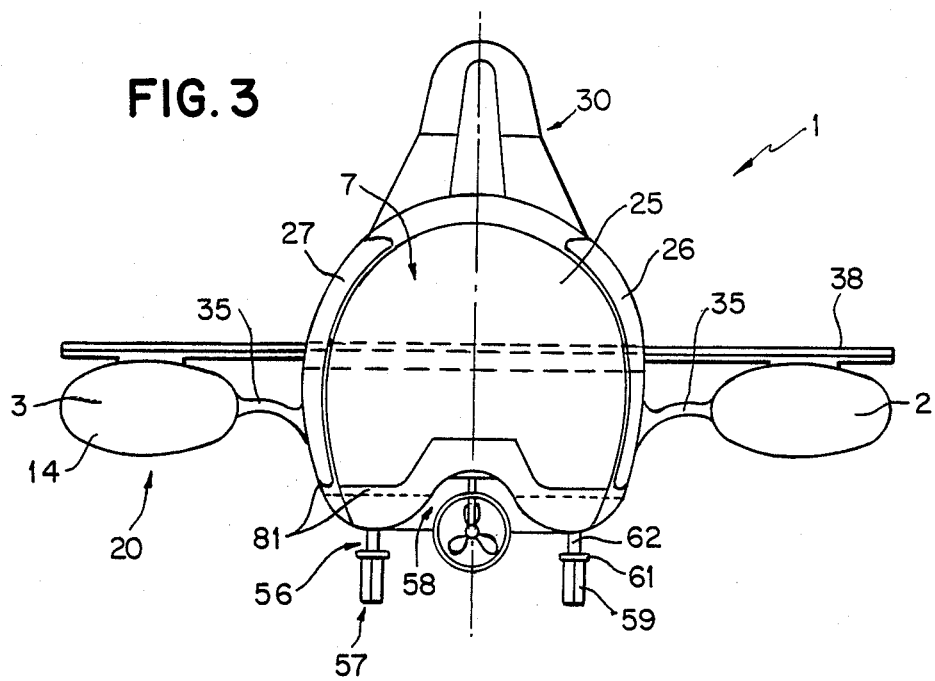
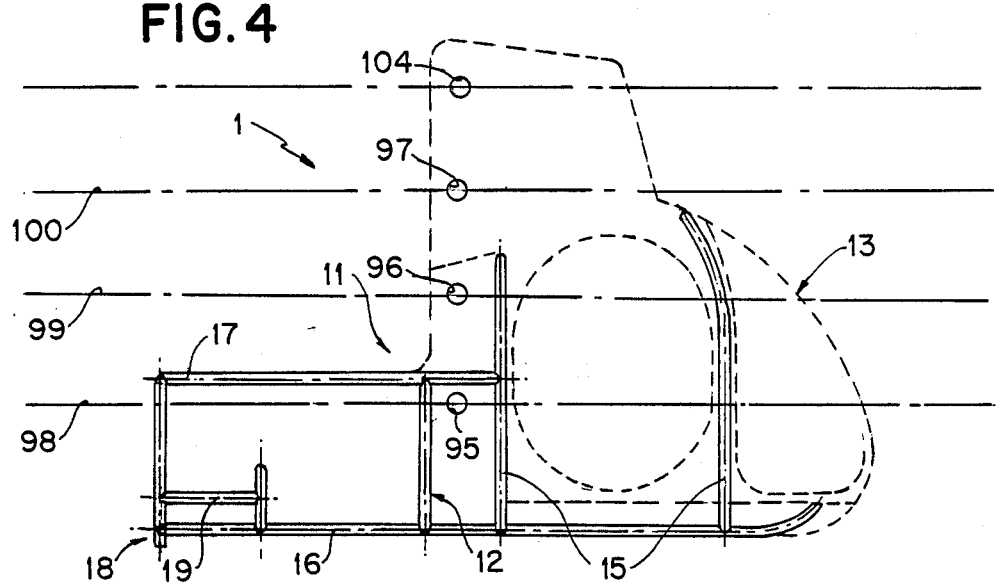
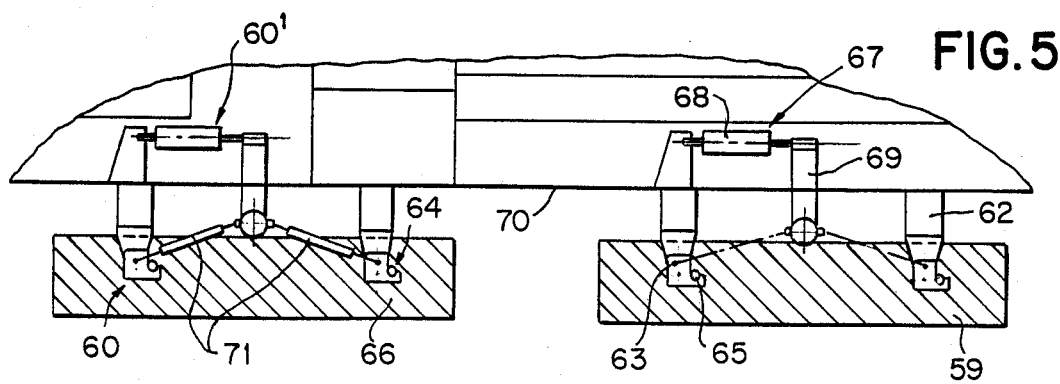

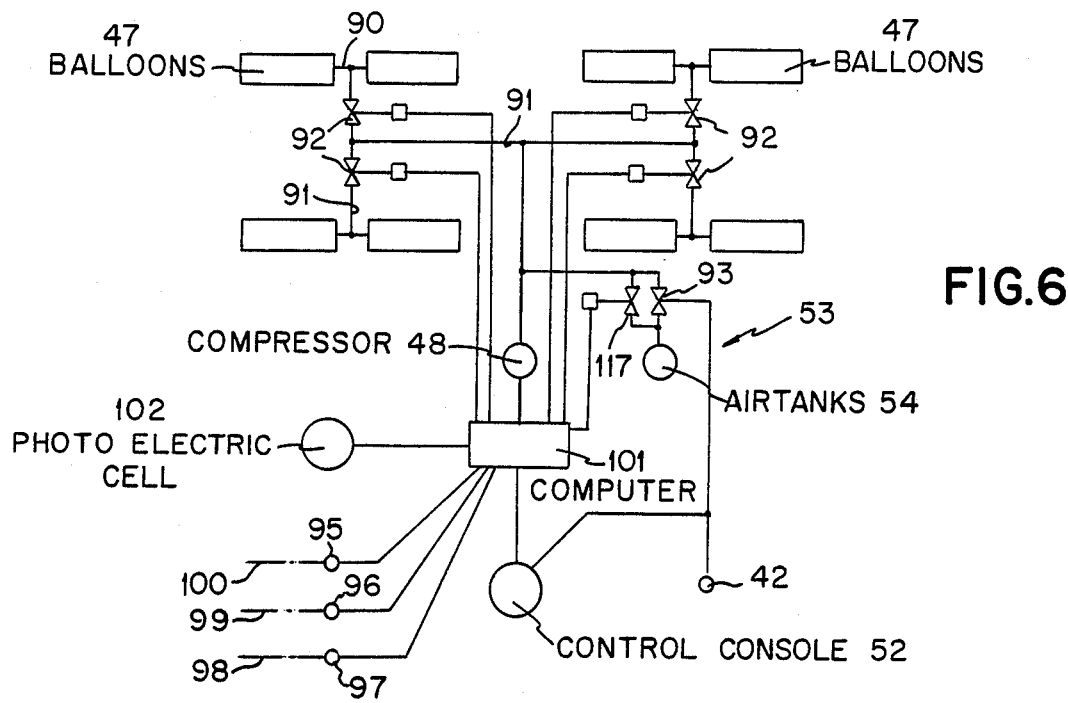
FIG.6
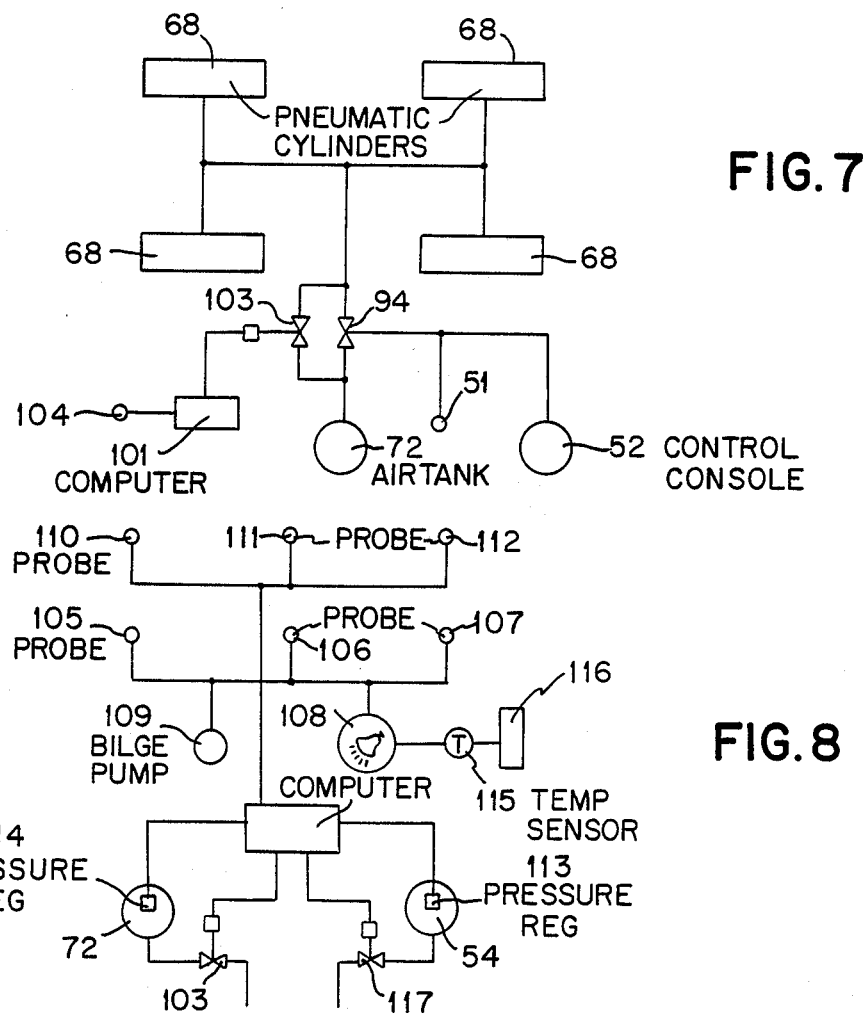
FIG.7
FIG.8

SEMI-SUBMERSIBLE MARINE CRAFT

This is a continuation-in-part application of my application, Ser. No. 06/738,038, filed May 24, 1985, and now abandoned.

BACKGROUND OF THE INVENTION

1. Field of the Invention:

This invention relates in general to semi-submersible marine craft or boats, and has specific reference to a semi-submersible marine craft adapted to be power-operated in both surface and semi-submerged conditions. The craft consists essentially of a pair of parallel spaced tubular floats disposed horizontally, symmetrically on either side of a vertical median plane, and of a central nacelle containing a power unit and a passenger's cabin.

2. The Prior Art:

Various types of marine craft, such as the so-called water-bikes or pedalled craft, have already been proposed for seaside leisure and amusement parks. A popular marine craft of this kind has a pair of parallel spaced floats of such length, cross-section and material that they impart the necessary buoyancy on water. Seats are arranged between the floats for the users who can thus assume a seated position in which they can efficiently actuate bike-like pedals driving either a paddle wheel or a screw disposed at the rear end of the craft. Thus, the craft is driven by the users' muscular energy. When the users get tired, they stop pedalling and the craft bobs up and down on the waves. These crafts, however, cannot be used for the observation of underwater marine fauna and flora.

The inconvenience of such known craft accounts for the increasing trend towards skin and scuba diving and underwater fishing, notably for the observation of marine fauna and flora by the divers. It is, however, necessary on the one hand to acquire the necessary diving equipment and on the other hand to have the physical fitness necessary for participating in these sports. Moreover, skin and scuba diving are both a hazardous sport. Divers must accordingly comply with safety regulations which in many cases are rather burdensome.

So-called "pocket" submarines used either for warfare or peaceful purposes in underwater exploration or various underwater interventions are also known. These submersibles cannot be used as instruments of leisure, since they call for considerable training of the users and also for a top physical condition.

SUMMARY OF THE INVENTION

It is a primary object of the present invention to provide a semi-submersible marine craft or boat adapted to be propelled both on the water surface and in a semi-submerged state. The semi-submersible craft has a pair of parallel, laterally spaced tubular floats disposed horizontally symmetrically on either side of a median vertical plane of symmetry of the craft. A central structure functions as a hull provided with a power unit. This central structure is in the form of a nacelle comprising a watertight cabin for one or more passengers and means for semi-submerging the craft and also for controlling its ascent back to the surface. Furthermore, the craft comprises control and safety devices for controlling the underwater and surface operation of the craft.

THE DRAWINGS

FIG. 3 is a front view of the semi-submersible craft of FIG. 1;

FIG. 4 is a diagrammatic side-elevational view of the central structure or hull of the semi-submersible craft, illustrating the cabin in dash lines;

FIG. 5 is a detail view, on a larger scale, illustrating ballasts connected through detachable means, notably of the "twistlock" or swing bar type, to the semi-submersible craft, with means for automatically jettisoning the ballast;

FIG. 6 is a connection diagram of balloons housed in the lateral tubular floats of the semi-submersible craft;

FIG. 7 is a connection diagram of a device for automatically jettisoning the ballast; and FIG. 8 is a connection diagram of a fire detector and apparatus for controlling flooding of the different hull compartments.

DESCRIPTION OF THE PREFERRED EMBODIMENT

Figure 1:
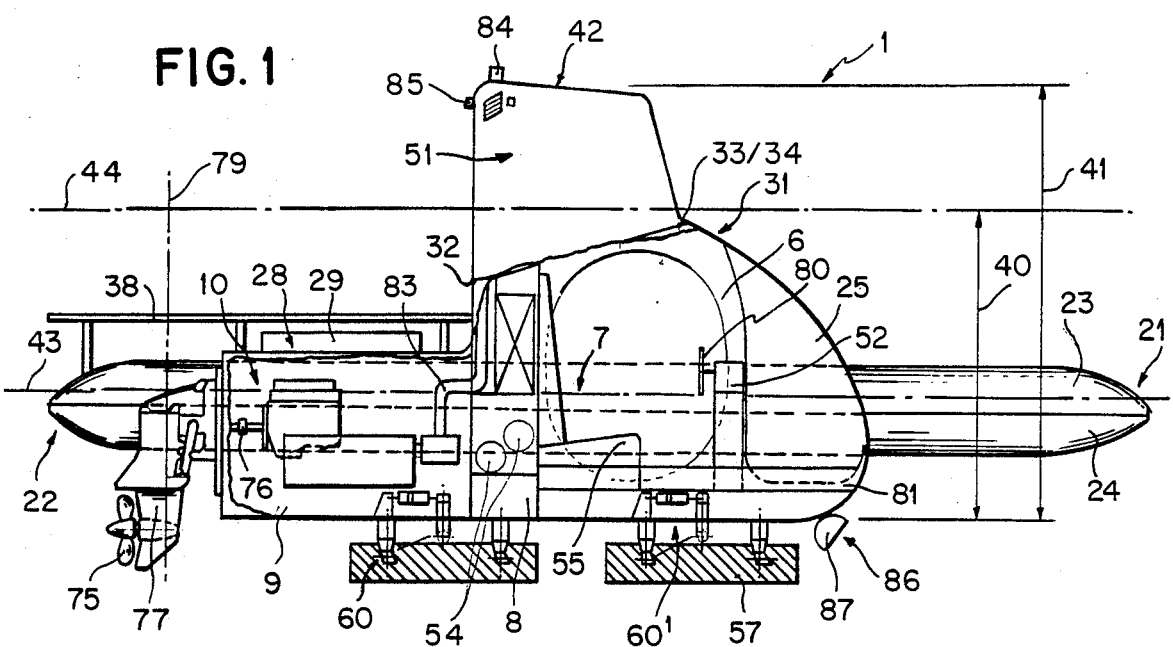
FIG. 1 is a side-elevational view, with parts broken away, of the semi-submersible craft according to the present invention.
Figure 2:
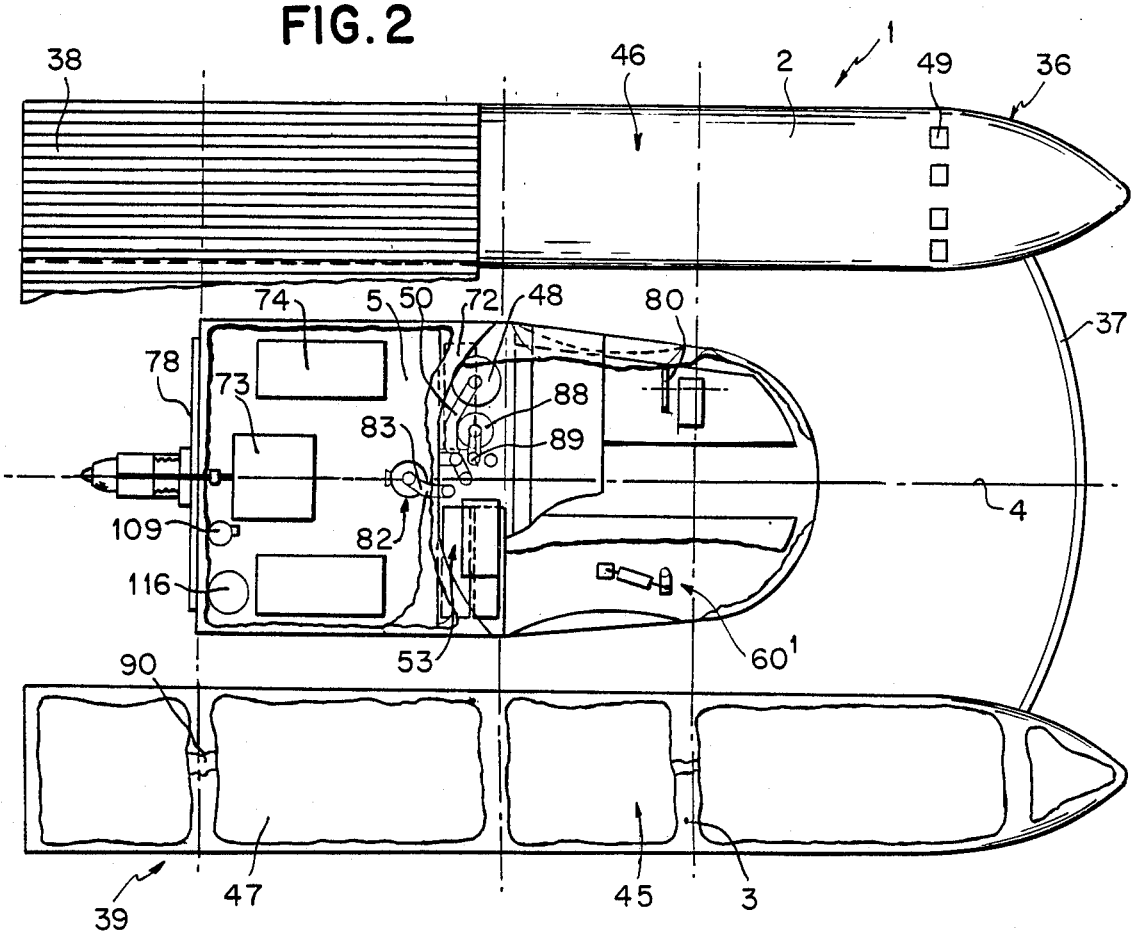
FIG. 2 is a plan view from above, with parts broken away, of the semi-submersible craft of FIG. 1.

Referring to the drawings, the semi-submersible craft 1 consists of three main elements, namely a pair elongate, parallel spaced tubes or tubular floats 2, 3 disposed horizontally on either side of a median vertical plane 4, and of a central nacelle 5. The tubular floats function as flotation and water ballast floats. The central nacelle 5 is divided into three sections, namely, a front compartment 6 comprising a cabin 7 for the passengers, a central or control gear compartment 8 and a stern compartment 9 housing the power or drive unit 10.

The central nacelle 5 of the semi-submarine craft 1, like the parallel lateral tubular floats 2, 3, is a frame structure 11 made of welded stainless steel sections 12 and of a skin 13, 14 made of fiberglass, carbon fibre or other suitable multi-layer fabric alternating with resin layers.

The frame structure 11 of the central nacelle 5 comprises a plurality of arches 15 disposed in a vertical plane and corresponding substantially to the shape of the skin 13. These arches 15 are interconnected by lower and upper longitudinal members 16, 17 respectively. The frame structure 11 further comprises, in a rear and bottom portion 18, means 19 for supporting the power unit 10. The support means 19, like the other component elements of the frame structure 11, consists of preferably tubular section members such as members 12 assembled by welding or otherwise.

The lateral parallel tubular floats 2, 3 comprise preferably a plurality of annular elements spaced from one another in a vertical plane by means of longitudinal members extending throughout the length of the floats 2, 3. The cross-sectional shape of this structure is subordinate to that of the skin 14.

Preferably, the skin 14 of the tubular floats 2, 3 has a substantially ovoid configuration. However, to promote the flow of water along the floats 2, 3 when operating underwater, the skin 14 may have a V-shaped streamlined lower portion 20. Similarly and preferably, the bow and stern ends 21, 22 of the floats 2, 3 have a shape consistent with the laws of hydordynamics.

Advantageously, the skin 14 consists of two half-shells 23, 24 assembled by bolting. This feature greatly facilitates the assembling and disassembling of the floats 2, 3. However, to improve the rigidity of the floats 2, 3, it is preferable to merge their structure with that of the lower half-shell 24 by using fiberglass, carbon fibers or like fabric, in conjunction with a suitable resin.

The skin 13 of the central nacelle 5 has a substantially spherical configuration around the cabin 7, with transparent areas comprising a bulbous front portion 25 and lateral windows or port lights 26, 27. The transparent areas afford the passengers a panoramic view, for a convenient observation of the underwater fauna and flora. In contrast thereto, this skin 13 has a parallelipipedic configuration around the stern compartment 9 and comprises on its top surface 28 a hatch closed in a watertight manner by a removable hatch cover 29 to facilitate the access to the power unit 10.

The central nacelle 5 is also provided with a dome or hood 30 covering partially the front portion 31 of front compartment 6. This dome 30 facilitates the access of the passengers to cabin 7 of the semi-submersible craft 1. For this purpose, the dome or hood 30 is hingedly mounted to the front compartment 6 and adapted to open rearwardly of the craft 1 by pivoting about a horizontal hinge pin 32. Advantageously, this dome 30 is also provided with watertight closing means preventing the ingress of water into the cabin during the semi-submerged operation of the semi-submarine craft 1.

According to a preferred form of embodiment, this watertight closing device consists of a wheel-type system operating dogs, well known in the field of sea-going craft. Of course, this water-tight closing device may also be of simpler design, for example, in the form of a seal applied to the lower edge 33 of the dome 30 and adapted to be compressed against an upper edge 39 of front compartment 6 when closing the dome or hood 30 by using any suitable and known locking device.

Whatever the means adopted for closing the dome, it is essential that the dome 30 can be opened from both inside and outside the cabin 7, so that in case of technical or human failure rescuers can intervene rapidly.

It will be seen that due to the moderate stress exerted on the dome 30, the dome can be made from a skin of synthetic resin or like material, without any rigid framing structure.

Each tubular float 2, 3 is connected to the central nacelle 5 by means of links 35 consisting of tubular sections each having hinge means, not shown, between their ends which permit a ninety-degree upward movement of the floats. Due to this hinged connection between the floats 2, 3 and the central nacelle 5, the overall width of the semi-submersible craft 1 can be reduced appreciably while facilitating its transport by road. Besides, the front portions 36 of the floats 2, 3 are also interconnected by another, arcuate tubular member 37 having a hemispheric cross-section, which also acts as a bumper or means for efficiently protecting the front bulb 25 in case the semi-submersible craft 1 hits an obstacle.

Preferably, the semi-submersible craft 1 is also provided with an open-work floor 38 supported by the rear portions 39 of tubes 2, 3. This open-work floor 38 may be used for transporting several passengers, for instance, skin divers.

According to the instant invention, the semi-submersible craft 1 comprises means for enabling the crew to operate the craft under semi-submerged conditions, and also to surface again.

The submerged depth 40 of craft 1 is less than the total height 41 of the front compartment 6 and dome 30, so that in all cases the top end 42 of this dome 30 emerges above the water level. The dash and dot lines 43 and 44 of FIG. 1 correspond to the water surface when the semi-submersible craft 1 is on the surface, shown at line 43, and when it is semi-submerged, shown at line 44.

The diving and surfacing operations of the semi-submersible craft 1 are controlled by means of ballast control elements or units 45, 46 consisting of balloons 47 of rubberized fabric housed in tubes 2 and 3. These balloons 47 are filled or exhausted with air accordingly as the craft 1 is on the surface or submerged. Preferably, four balloons 47 are incorporated in each tube 2, 3 and connected by pairs through conduit means 90. By scaling down their numbers, the safety of the sea craft 1 can be increased considerably, notably in case of puncture of one of said balloons 47. In fact, the other non-punctured balloons 47 are still capable of keeping the craft afloat.

A compressor 48 is housed in the control or technical compartment 8 and is connected through hoses 91 to the balloons 47. The compressor provides an output sufficient for inflating these balloons. The craft 1 is submerged by exhausting air from the ballast control units 45, 46 and allowing water to enter into the tubular floats 2, 4 through apertures 49 provided for this purpose in the skin 14 of the floats.

It can thus be seen that the craft is provided with flotation control means for variably controlling the buoyancy of the craft by controlling entry of water into the flotation and water ballast floats and the discharge of water therefrom for variably controlling volumes of water ballast in the floats to control the extent of partial submergence of the craft.

Also preferably, when the semi-submersible craft 1 is submerged, air is supplied to the compressor 48 and exhausted therefrom via a hose 50 connected thereto and opening into the upper portion 51 of the dome 30. This hose 50 may be provided at this open end 30 with a stop-valve or like device for obturating this end when the craft 1 is fully submerged.

The ballast units 45, 46 are selectively inflated or deflated by means of solenoid valves 92, the operation of which is controlled from the pilot's control console 52 in the front portion of the cabin 7. Also preferably, the compressor 48 is of the electric type and supplied with current from one or more storage batteries housed in the rear compartment 9, and this compressor can be controlled by means of a switch (not shown) disposed on the control console 52.

According to another specific feature of the present invention, the semi-submersible craft 1 comprises a complete set of control and safety apparatus for monitoring the craft in both submerged and surface operational conditions.

Thus, in case of failure of compressor 48, it is definitely necessary to have the possibility of surfacing the craft 1. For this purpose, the craft 1 is provided with means 53 for automatically inflating the balloons 47. Preferably, these means 53 consist of one or a plurality of compressed-air tanks 54 provided with an air regulator 93 and housed in the technical or control compartment 8 behind the passengers' seats 55. These compressed-air tanks 54 permit inflating the balloons 47 within a short time so that the marine craft 1 can break surface almost instantaneously. The air-tank regulator 93 can be actuated from two different locations, that is, either from the control console 52 or from the top 42 of dome 30. This dual safety arrangement is effective, in case of emergency such as a failure of the passengers enclosed in the cabin 7, for controlling from outside the surfacing of the craft 1. Preferably, the release of the air-tanks 54 regulators can also be controlled manually in case of electric circuit failure. The semi-submersible craft 1 also comprises, in its lower portion 56, ballast means 57 permitting of obtaining and maintaining the craft in this semi-submerged condition. These ballast means 57, which are four in number in this example and disposed on either side of a central longitudinal tunnel 58, consist of bars 59 filled with a high-density material such as lead, cast-iron or else. The bars 59 are releasably fastened by means of suitable means such as "twistlock" devices 60 to rails 61 secured in turn by means of fasteners 62 to the frame structure 11 corresponding to the central nacelle 5 of the craft. These releasable fasteners are adapted, under the control of automatic jettisoning means 60', to disconnect the ballasts 57 of craft 1 and thus cause the craft to break surface almost instantaneously by buoyancy. This automatic jettisoning device 60' is incorporated in the control and safety equipments of craft 1.

In a preferred form of embodiment of the invention, shown in FIG. 5, the releasable fasteners or "twistlock" means 60 consist of hooks 63 pivotally mounted on rails 61 or to the lower ends of legs 62. Gripping means 64 rigidly connected to the ballast bars 59 are engaged in the hook 63, the gripping means 64 consist in fact of studs 65 projecting from the lateral sides 66 of bars 59. On the other hand, the device 60 for automatically jettisoning the ballasts 57 comprises means 67 for rotating the hooks 63 and thus release the studs 65 therefrom. These rotary driving means 67 comprise essentially a fluid-actuated cylinder 68 housed in one compartment 6, 8 or 9 of the central nacelle 5 and adapted to rotate a rod 69 extending through the floor 70 of the semi-submersible craft 1. This rod 69 is connected in turn by means of arms 71 to the hooks 63 so as to cause the hooks to pivot about their horizontal axes, when required.

Preferably, the cylinders 68 are of the pneumatic type supplied with compressed air from an air tank 72 also housed in the technical compartment 8 of the central nacelle 5. A manually-operated valve 94 is provided for controlling from the pilot's or control console 52 the release of compressed air from air-tank 72 and therefore to the cylinders 68. The safety may be further enhanced by providing complementary means for controlling automatically the jettisoning of the ballasts 57 from the craft 1, said complementary control means being disposed in the upper portion 51 of the dome 30.

The semi-submersible craft 1 is driven by a power unit 10 housed in the stern compartment 9 of central nacelle 5. The power unit 10 comprises a preferably electric motor 73 supplied with current from one or a plurality of storage batteries 74 also housed in the stern compartment 9. However, for both technical and economical reasons, the semi-submersible craft 1 may be provided with an internal combustion engine. In this case, fuel tanks, for example, for gasoline or gasoil, are housed in the stern compartment 9 and substituted for the storage batteries 74.

The power unit 73, whether of the electric or internal combustion type, is attached to the support means 19 of frame structure 11 and drives a propeller 75 via a transmission shaft 76 and a propeller drive shaft housing 77 of the directional type. The propeller drive shaft housing 77 is pivotally secured to the transom 78 of stern compartment 9 and incorporates two sets of 90-degree bevel gears (not shown) due to the lower position of the axis of rotation of propeller 75 with respect to the transmission shaft 76. With this arrangement, the propeller 75 is constantly kept below the water surface, even when the craft 1 is progressing on the surface. Moreover, to improve its water-intake efficiency, it is preferable to arrange the propeller 75 below the bottom 56 of the craft. However, the distance between the propeller axis and the transmission shaft 76 should preferably be minimized for optimizing the stress distribution among the component elements of the frame structure 11 of the central nacelle 5. For this purpose, a central longitudinal tunnel 58 is provided in the bottom of the marine craft 1 to improve the water intake efficiency of propeller 75 while keeping to a relatively low value the distance between the propeller 75 and the transmission shaft 76.

The above-described propeller drive shaft housing 77 is well known in the art and very popular in the domain of inboard leisure boats. The propeller shaft housing 77 is of the type adapted to pivot about a vertical axis and therefore acts as a rudder for steering the marine craft 1. A cable transmission system (not shown) interconnecting a swing-bar attached to the propeller shaft housing 77 and a helm wheel 80 mounted on the control console 52 permit the manoeuvering of the marine craft 1.

According to another feature characterizing the present invention, the marine craft 1 is provided with three capacitive depth sensors fathometers 95, 96, 97 disposed on its outer wall at different heights corresponding to the surface 98, half-immersion 99 and maximum imersion 100 positions, respectively, of the craft. The function of these capacitive depth sensors or fathometers is to control the submergence depth of the craft. For this purpose, computerized means 101 responsive to the capacitive sensors are operatively connected to the control and safety equipments of the marine craft 1.

Thus, as a consequence of the electric signal emitted by the capacitive fathometers and of the data displayed on control console 52 by the helmsman, the computerized management means open or close the solenoid-operated valves and cause the operation or stopping of compressor 48 for draining or filling the ballasts 45 and 46, respectively.

Another function devolved to the above-described computerized management means consists in correcting the list and trim of the marine craft 1 in both surface and underwater operating conditions without any resorting to any manual intervention. These corrections are made according to data received by a photoelectric cell 102, recording the evolution of a weighted disk in front of a light beam. The list of the craft is corrected by controlling accordingly the inflation or deflation of the balloons 47 corresponding to one or the other ballast control units 45 or 46, respectively. On the other hand, due to the arrangement of said balloons 47 in each float 2, 3, the trim of the marine craft 1 can be corrected by varying the inflation pressure of the two balloons 47 disposed in the fore portion of each float 2, 3 with respect to the other two balloons 47 disposed in the aft portion of the floats. The control action exerted by the computerized data management means 10 on the inflation pressure of each pair of balloons 47 is obtained by means of solenoid-operated valves 92 controlling the inflation and the deflation.

Other functions devolved to the above-described computerized management means 101 consist in controlling the quick upward movement of the marine craft 1 in case of failure of any equipment thereof. Thus, in case of failure of compressor 48 and the consequent pressure drop in air-tanks 54, the computerized management means are effective to control, via a solenoid valve 103, the expansion of the compressed air contained in air-tank 72 and therefore the jettisoning of the ballasts 57. This jettisoning may take place as a consequence of data emitted from a fourth capacitive depth sensor or fathometer 104 displaying the position or depth of the craft 1 below the surface, this fathometer being disposed on top 42 of the dome 30.

Preferably, the marine craft 1 is also provided with means for controlling the flooding of any compartment 6, 8 or 9, the control means advantageously consists of other capacitive probes 105, 106, 107 disposed in the bottom of each compartment 6, 8, 9 and adapted, when the presence of water is detected in one or more of said compartments, to deliver an electric signal converted into a light or sound signal 108. These capacitive probes may also control directly the operation of a bilge pump 109. In case the passengers did not react to the signals thus emitted, another set of capacitive probes 110, 111, 112, disposed at a higher level than the preceding ones will control through suitable computerized management means 101 and solenoid-operated valves 92, 117 the release of jettisoning of ballasts 57 of the quick inflation of balloons 47.

According to the instant invention, the computerized data management means incorporated therein permit drawing up of a complete and immediate balance concerning the operation of all the apparatus of the marine craft 1 before each submergence. For this purpose, the air-tanks 54 and 72 of the automatic inflation device 53 for balloons 47 and of the automatic jettisoning device 60 of ballasts 57, respectively, are provided with pressure regulators 113, 114. Thus, according to the data signal emitted by these regulators, the computerized data management means permit or not the submergence of the marine craft 1. Care will be taken that the data concerning the limit threshold pressure values below which the seaworthiness of craft 1 is not sufficient to warrant a safe submergence be stored beforehand in the computerized data management means.

It is a frequent occurence that, during a submergence operation, relatively great temperature differences develop between the exterior and the interior of the cabin 7, so that moisture or condensation is deposited on the transparent areas of skin 13. To avoid this inconvenience of fogging or steaming of the transparent areas, the marine craft 1 comprises ventilation means 88 for preventing this condensation deposit. The ventilation means 88 comprise a fan for taking air from the external atmosphere and forcing it into the cabin 7 through hose 89 provided with outlet ports disposed in the lower portion 81 of the bulbous front portion 25 and of the lateral windows 26, 27. This external air is taken at the level of an inlet port disposed in the upper portion 51 of dome 30; the inlet port is also used for exhausting the air contained in the cabin 7. Preferably, this port, like conduit 50, is provided with valve means for closing the port in case of complete submergence of the marine craft 1.

To improve the efficiency of the above-described ventilation means, the air blown into the cabin 7 is firstly heated by means of electrical resistances arranged in ports disposed under the transparent areas. Another improvement of these ventilation means consists in providing the ports with means for adjusting and orienting the flow of air blown into the cabin 7. Thus, by properly controlling the adjustment and orienting means, the occupants of the craft can direct the air flow towards the transparent areas of skin 13 and adjust the magnitude of this flow. Of course, these adjustment means may be exactly similar to those now in conventional use on land vehicles for adjusting and orienting the air flow toward the windshield on the vehicle.

The safety equipment of this marine craft 1 is completed by a fire detector installed in the stern compartment 9 housing the power unit 10. This fire detector may consist, for example, of a temperature sensor 115 capable of delivering an electric signal when the temperature rises above a predetermined or threshold value. This signal is converted into a sound or light signal 108 and/or impulses controlling a fire extinguisher 116. Of course, the temperature sensor may be replaced by any other device capable of detecting a fire or incipient fire developing in the stern compartment 9 of marine craft 1. Thus, a smoke detector may be substituted for this temperature sensor.

For preventing fire hazards, the stern compartment 9 may be provided with ventilation means 82 for supplying combustion air to the power unit 10 and cooling the motor or engine 73. If an internal combustion engine is used, the ventilation means 82 further permit supplying of the engine with oxygen and exhausting the inflammable fuel vapors. The fresh or external air supply is made as in the other above-discussed cases via a conduit 83 housed in the dome 30 and opening into the upper portion 51 thereof. It will be seen that the internal combustion engine exhaust gas may be released in the atmosphere through either an exhaust pipe opening to the exterior of the skin 13 or an exhaust silencer incorporated in the propeller drive shaft housing 77. This latter solution is currently adopted in boats equipped with such propeller drive shaft housing 77.

Moreover, the marine craft 1, according to the present invention, comprises a number of safety equipments necessary for navigation, such as a helm-angle indicator, a compass, a VHF radio emitter, a periscope. On the other hand, the dome 30 is provided with a radar concentrator or reflector cup, a rotating beacon or strobe flasher 84 for visual detection of the marine craft 1 when submerged, and an aerial consistent with the radio-transmitter. The dome 30 is also provided with the required navigational lights 85.

Finally, the marine craft 1 is provided with a set of comfort equipments comprising the furniture necessary for enabling the cabin 7 to accommodate one or more passengers, a grating or open-work floor 38, handrails and the like permitting the transport of one or more divers under the maximum safety conditions. Search lights 87 for illuminating the sea bottom and enhancing the colors and scenery thereof may also be provided at the lower front portion 86 of the craft.

What I claim is:

1. A semi-submersible marine craft comprising, a watertight hull having a passenger cabin made in part of transparent material, two elongate, tubular flotation and water ballast floats secured on opposite sides of the hull, the two floats having means for independently receiving volumes of water internally thereof and discharging the water therein, flotation control means for variably controlling the buoyancy of the craft by controlling entry of water into the flotation and water ballast floats and discharge of water therefrom for variably controlling volumes of water ballast in the floats to control extent of partial submergence of the craft including the hull and surfacing thereof, the water ballast effectively partially submerging the craft hull for viewing from the passenger cabin below the water surface in a partially submerged condition of the cabin, the flotation control means including other ballast below the level of the floats, means for jettisoning said other ballast, a driven propulsion shaft having a drive screw driven rotationally from internally of the hull, and drive means internally of the hull for rotationally driving said drive shaft for driving the marine craft forwardly and astern.

2. A semi-submersible marine craft according to claim 1, in which said flotation control means comprises sensors for detecting water levels relative to the passenger cabin, and means responsive to said sensors for automatically controlling the volume of said water ballast to control extent of submergence of the craft.

3. A semi-submersible marine craft according to claim 2, in which said sensors are capacitive devices disposed exteriorly of said hull.

4. A semi-submersible marine craft according to claim 1, having two platforms symmetrically disposed relative to the hull on opposite sides thereof and above the level of the floats.

5. A semi-submersible marine craft according to claim 4, in which said platforms have sufficient surface area to hold skin and scuba divers as passengers thereon.

6. A semi-submersible marine craft according to claim 1, in which said hull is a nacelle disposed between the two flotation and water ballast floats and displaces water when the craft is on the water surface and in a partially submerged condition, and the nacelle having a domed hood pivotally mounted for entry into the passenger cabin.

7. A semi-submersible marine craft according to claim 6, in which said nacelle comprises an astern machinery compartment, for said drive means astern of the passenger cabin.

8. A semi-submersible marine craft according to claim 7, wherein said drive means is located in said astern compartment for driving said screw.

9. A semi-submersible marine craft according to claim 1, including capacitive probes disposed in said hull for detecting flooding and developing signals for controlling the discharge of water from the interior of the hull, and pump means for responding to signals from said probes and for pumping water out of the hull.

10. A semi-submersible marine craft according to claim 1, in which said means for jettisoning includes automatic means for jettisoning said other ballast, and a capacitive sensor disposed on the hull to detect an undesired level of submergence for activating said automatic means if said undesired level of submergence obtains.

11. A semi-submersible marine craft according to claim 1, including automatic trim control means for automatically controlling the trim of the craft comprising means for detecting the trim of the craft, and means for automatically activating said flotation control means to correct the trim when required.

12. A semi-submersible marine craft according to claim 1, in which said other ballast is solid material.

13. A semi-submersible marine craft according to claim 1, in which said means for jettisoning said other ballast comprises means for jettisoning at will.

14. A semi-submersible marine craft according to claim 1, in which said means for jettisoning said other ballast comprises means for automatically jettisoning said other ballast when predetermined conditions obtain during submergence.

15. A semi-submersible marine craft according to claim 1, in which said other ballast is solid and sufficiently affects buoyancy so that immediately upon jettisoning thereof the marine craft can surface from a submerged condition.

16. A semi-submersible marine craft according to claim 1, in which said floats each contains a plurality of air-inflatable balloons, and which said flotation control means comprises means for variably inflating and deflating said balloons, and the floats having a plurality of openings for entry and discharge of water from internally of the floats.

17. A semi-submersible marine craft according to claim 16, in which said flotation control means comprises air inflating means for variably inflating the air-inflatable balloons to vary the volume of water received internally of the corresponding floats.

18. A semi-submersible marine craft according to claim 17, in which said air-inflatable balloons in each float are serially connected.

19. A semi-submersible marine craft according to claim 18, in which said air-inflating means comprises an air compressor connected for supplying air under pressure to each of the floats independently of each other.

* * * * *